US008763036B2

(12) United States Patent
Seppälä et al.

(10) Patent No.: US 8,763,036 B2
(45) Date of Patent: Jun. 24, 2014

(54) METHOD FOR INDICATING SERVICE TYPES IN THE SERVICE GUIDE

(75) Inventors: Martta Seppälä, San Diego, CA (US); Toni Paila, Degerby (FI)

(73) Assignee: Nokia Corporation, Espoo (FI)

( * ) Notice: Subject to any disclaimer, the term of this patent is extended or adjusted under 35 U.S.C. 154(b) by 1022 days.

(21) Appl. No.: 11/266,399

(22) Filed: Nov. 4, 2005

(65) Prior Publication Data

US 2007/0107013 A1   May 10, 2007

(51) Int. Cl.
| | |
|---|---|
| *H04N 5/445* | (2011.01) |
| *H04N 21/262* | (2011.01) |
| *H04N 21/462* | (2011.01) |
| *H04N 5/44* | (2011.01) |

(52) U.S. Cl.
CPC ....... *H04N 21/26283* (2013.01); *H04N 21/462* (2013.01); *H04N 2005/4412* (2013.01)
USPC ................... 725/39; 725/41; 725/48; 725/57; 725/61

(58) Field of Classification Search
CPC ..................... H04N 21/26283; H04N 21/462; H04N 2005/4412
USPC .................... 725/39, 41, 48, 57, 61
See application file for complete search history.

(56) References Cited

U.S. PATENT DOCUMENTS

| | | | |
|---|---|---|---|
| 6,002,394 A * | 12/1999 | Schein et al. ................... 725/39 |
| 6,469,753 B1 | 10/2002 | Klosterman et al. | |
| 6,762,773 B2 * | 7/2004 | Kolde et al. ................... 715/716 |
| 6,898,762 B2 * | 5/2005 | Ellis et al. ...................... 715/716 |
| 7,477,890 B1 * | 1/2009 | Narayanaswami ........ 455/414.1 |
| 7,571,458 B1 * | 8/2009 | Eyal .............................. 725/137 |
| 2002/0003882 A1 * | 1/2002 | Jones ............................ 380/210 |

(Continued)

FOREIGN PATENT DOCUMENTS

| | | |
|---|---|---|
| CN | 1171457 C | 10/2004 |
| EP | 0551433 | 7/1993 |

(Continued)

OTHER PUBLICATIONS

Open Mobile Alliance, Service Guide for Mobile Broadcast Services, Draft Version 1.0, OMA-TS-BCAST_ServiceGuide—V1_0_0-20050818-D, Aug. 18, 2005.

(Continued)

*Primary Examiner* — Pankaj Kumar
*Assistant Examiner* — Sahar Baig
(74) *Attorney, Agent, or Firm* — Ditthavong Mori & Steiner, P.C.

(57) ABSTRACT

Provided are apparatuses and methods in a digital broadcast transmission system for transmitting information on a type of service or program and/or interactivity or interaction information for the service or program. In one example, a parameter or attribute is provided in an ESG fragment for indicating the type of program or service and the type of interaction associated with the program or service. In another example, a first parameter is provided for indicating the type of program or service and a second parameter is provided for indicating the type of interaction associated with the program or service. The parameter or attribute may be included in metadata of the ESG fragment.

38 Claims, 8 Drawing Sheets

(56) References Cited

U.S. PATENT DOCUMENTS

| | | | |
|---|---|---|---|
| 2002/0021696 A1 | 2/2002 | Minborg | |
| 2002/0059621 A1* | 5/2002 | Thomas et al. | 725/87 |
| 2003/0073466 A1* | 4/2003 | Tanaka et al. | 455/566 |
| 2003/0149988 A1* | 8/2003 | Ellis et al. | 725/87 |
| 2003/0211856 A1* | 11/2003 | Zilliacus | 455/466 |
| 2003/0229900 A1* | 12/2003 | Reisman | 725/87 |
| 2005/0090235 A1* | 4/2005 | Vermola et al. | 455/414.3 |
| 2005/0097595 A1* | 5/2005 | Lipsanen et al. | 725/25 |
| 2005/0188408 A1 | 8/2005 | Wallis et al. | |
| 2005/0221771 A1* | 10/2005 | Himeno | 455/90.3 |
| 2005/0259604 A1* | 11/2005 | Salmi | 370/310 |
| 2006/0167903 A1* | 7/2006 | Smith et al. | 707/100 |
| 2006/0253544 A1* | 11/2006 | Luoma et al. | 709/217 |
| 2006/0262751 A1* | 11/2006 | Vermola et al. | 370/331 |
| 2007/0010266 A1* | 1/2007 | Chaudhuri | 455/466 |

FOREIGN PATENT DOCUMENTS

| | | |
|---|---|---|
| EP | 1355241 A2 | 10/2003 |
| WO | WO 99/20049 | 4/1999 |
| WO | WO03/032148 | 4/2003 |
| WO | WO03/034735 | 4/2003 |
| WO | WO2004/015917 | 2/2004 |
| WO | WO 2005/045603 A2 | 5/2005 |

OTHER PUBLICATIONS

Chinese Office Action for corresponding CN Application No. 200680040938X, dated Feb. 12, 2010, China.

European Office action for corresponding EP App. No. 06 809 159.4-2202 dated Jul. 20, 2010, pp. 1-5.

European search report for corresponding EP App. No. 06 809 159.4-2202 dated Jul. 7, 2010, pp. 1-4.

Korean Office action for corresponding KR Application No. 10-2008-7012732, Jun. 9, 2010, Korea, pp. 1-5.

Mexican Office office action for corresponding MX App. No. MX/a/2008/00524 dated Jun. 18, 2010, pp. 1-7.

The TV-Anytime Forum: "Requirements Series: R3 ON: Metadata Requirements (Normative)", Apr. 7, 2000, pp. 1-41.

Korean Office Action for corresponding KR Application No. 10-2008-7012732, Dec. 18, 2009, Korea.

Russian Office Action for corresponding RU Application No. 2008112559/09(013584), Jan. 12, 2010, Russia.

Russian Office Action for corrresponding RU Application No. 2008112559/09(013584), Sep. 3, 2009, Russia.

Sharp Corporation: Using MMS Message Template for Service Interaction. OMA-BCAST-2005-0428-MMS-Template-Service-Interaction, Sep. 12, 2005, pp. 1-11.

Canadian Office Action for corresponding CA Application No. 2,624,048, Jul. 31, 2009, Canada.

Chinese Office Action for corresponding CN Application No. 200680040938.X, May 8, 2009, China.

Rauschenbach, U., et al.:ESG Datamodel Comparison between OMA BCAST and DVB CBMS. Open Mobile Alliance, pp. 1-40.

Russian Office Action for corresponding RU Application No. 2008112559/09(013584), Apr. 1, 2009, Russia.

Korean Office action for corresponding KR Application No. 10-2008-7012732, Dec. 7, 2010, Korea, pp. 1-4.

Korean Office action for corresponding KR Application No. 10-2008-7012732, Feb. 16, 2011, Korea, pp. 1-3.

Canadian Office Action for corresponding CA Application No. 2,624,048, Mar. 22, 2011, Canada, pp. 1-3.

Office Action for related Canadian Patent Application No. 2,624,048 dated Jul. 4, 2012, pp. 1-2.

Office Action for corresponding Canadian Application No. 2,624,048 issued Aug. 1, 2013, 3 pages.

* cited by examiner

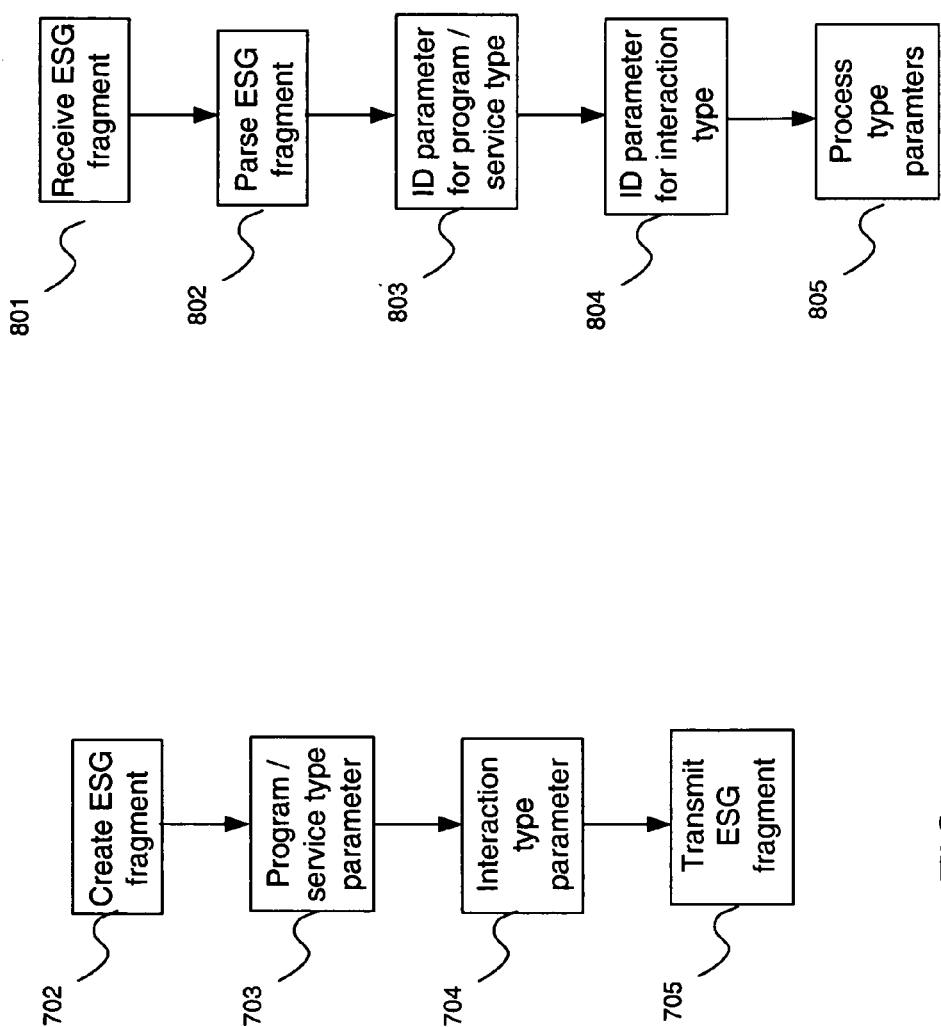

METHOD FOR INDICATING SERVICE TYPES IN THE SERVICE GUIDE

FIELD OF THE INVENTION

The invention relates generally to communications networks. More specifically, the invention provides for providing service types in a communication network.

BACKGROUND OF THE INVENTION

Generally, an Electronic Service Guide (ESG) enables a terminal to communicate what services are available to end users and how the services may be accessed. ESG fragments are independently existing pieces of the ESG. Traditionally, ESG fragments comprise XML documents, but more recently they have encompassed a vast array of items, such as for example, a SDP (Session Description Protocol) description, textual file, or an image. The ESG fragments describe one or several aspects of currently available (or future) service or broadcast programs. Such aspects may include for example: free text description, schedule, geographical availability, price, purchase method, genre, and supplementary information such as preview images or clips. Audio, video and other types of data comprising the ESG fragments may be transmitted through a variety of types of networks according to many different protocols. For example, data can be transmitted through a collection of networks usually referred to as the "Internet" using protocols of the Internet protocol suite, such as Internet Protocol (IP) and User Datagram Protocol (UDP). Data is often transmitted through the Internet addressed to a single user. It can, however, be addressed to a group of users, commonly known as multicasting. In the case in which the data is addressed to all users it is called broadcasting. The ESG data may be transmitted using different types of wireless digital networks including digital broadband broadcast, bidirectional, and/or multicast networks.

Many types of services may be broadcast to a subscriber terminal or receiver. For instance, a basic TV service, clipcast service, mixed service or radio service can be broadcast from a service provider to a terminal or plurality of terminals. The type of service provided can be indicated in an ESG. However, interactivity is provided only as part of the type of service. This creates a more complex enumeration that is difficult to maintain. Moreover, it is problematic to add additional combinations of services and interactivity and certain different combinations of services are not indicated as a result of the increased complexity. Also, the type of interactivity is not provided.

Thus, there exists a need for a method and system for providing interactivity information in a simple, efficient, yet comprehensive manner to allow more accurate information regarding a corresponding service. There is also a need to provide information in an ESG on the type of interactivity provided.

BRIEF SUMMARY OF THE INVENTION

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the more detailed description below.

In one example, a first parameter or attribute is provided in an ESG fragment for indicating a type of program or service. Also, a second parameter or attribute may be provided for indicating a type of interaction associated with the program or service. The first parameter or the second parameter may have a value indicating a corresponding type of program or service or interaction associated with the program or service, respectively.

In another example, a parameter or attribute may be provided in an ESG fragment having a value corresponding to a type of program or service or an interaction associated with the program or service. For example, the value of the parameter or attribute may be selected from a first plurality of values for indicating a type of program or service or the parameter or attribute may be selected from a second plurality of values for indicating a type of interaction associated with the program or service.

In another example, a parameter or attribute may be provided in an ESG fragment having a value corresponding to both a type of a program/service and an interaction associated with the program/service. Alternatively, the parameter or attribute may have a value corresponding only to an interaction associated with the program/service.

In another example, a receiver is provided for receiving an ESG fragment corresponding to a program or service in which the ESG fragment may contain a parameter or attribute or a plurality of parameters or attributes for indicating a type of program or service and/or an interaction associated with the program or service.

In another example, a transmitter is provided for creating an ESG fragment corresponding to a program or service in which the ESG fragment may contain a parameter or attribute or a plurality of parameters or attributes for indicating a type of program or service and/or an interaction associated with the program or service.

In yet another example, a computer-readable medium is provided for providing a program or service based on a parameter or attribute or plurality of parameters or attributes in an ESG fragment for indicating a type of program or service and/or a type of interaction associated with the program or service.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 7 illustrates a flow chart of an example of transmitting an ESG fragment containing information on a type of program or service and/or a type of interaction associated with the program or service in which one or more illustrative embodiments of the invention may be implemented.

FIG. 8 illustrates a flow chart of an example of receiving an ESG fragment containing information on a type of program or service and/or a type of interaction associated with the program or service in which one or more illustrative embodiments of the invention may be implemented.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

Figure 1:
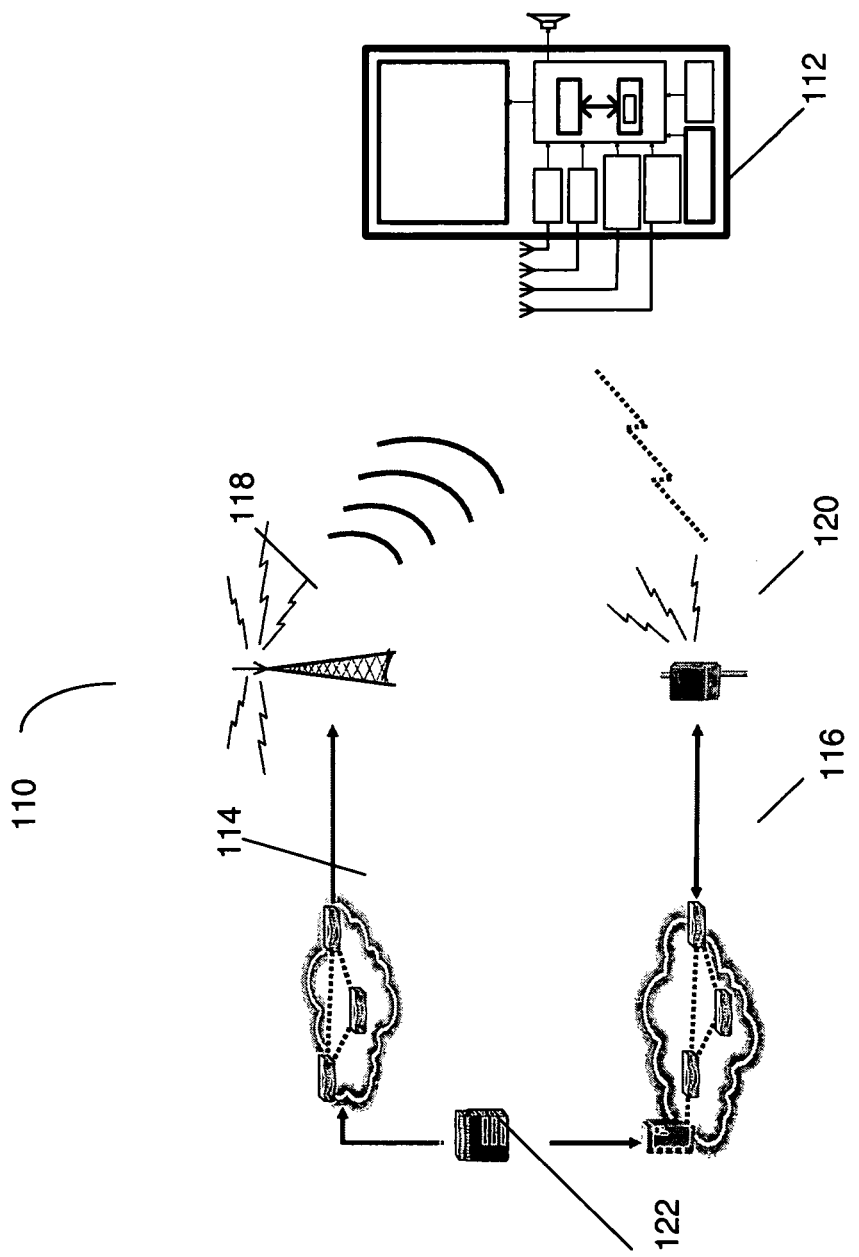
FIG. 1 illustrates a block diagram of a wireless communication system in which various aspects of the present invention may be implemented.

Aspects of the present invention may be utilized across a broad array of networks and communication protocols. FIG. 1 illustrates an example of a wireless communication system 110 in which the systems and methods of the invention may be employed. One or more network-enabled mobile devices 112, such as a personal digital assistant (PDA), cellular telephone, mobile terminal, personal video recorder, portable television, personal computer, digital camera, digital camcorder, portable audio device, portable radio, or combinations thereof, are in communication with a service source 122 through a broadcast network 114 and/or cellular network 116. The mobile terminal/device 112 may comprise a digital broadband broadcast receiver device. The service source 122 may be connected to several service providers that may provide their actual program content or information or description of their services and programs to the service source that further provides the content or information to the mobile device 112. The several service providers may include but are not limited to one or more television and/or digital television service providers, AM/FM radio service providers, SMS/MMS push service providers, Internet content or access providers.

One way of broadcasting data is to use an IP datacasting (IPDC) network. IPDC is a combination of digital broadcast and Internet Protocol. Through such an IP-based broadcasting network, one or more service providers can supply different types of IP services including on-line newspapers, radio, and television. These IP services are organized into one or more media streams in the form of audio, video and/or other types of data. To determine when and where these streams occur, users refer to an electronic service guide (ESG). One type of DVB is Digital video broadcasting-handheld (DVB-H), a recently developed technology that increases the capabilities and services available on small handheld devices, such as mobile telephones. The DVB-H is designed to deliver 10 Mbps of data to a battery-powered terminal device.

DVB transport streams deliver compressed audio and video and data to a user via third party delivery networks. Moving Picture Expert Group (MPEG) is a technology by which encoded video, audio, and data within a single program is multiplexed, with other programs, into a transport stream (TS). The TS is a packetized data stream, with fixed length packets, including a header. The individual elements of a program, audio and video, are each carried within packets having a unique packet identification (PID). To enable a receiver device to locate the different elements of a particular program within the TS, Program Specific Information (PSI), which is embedded into the TS, is supplied. In addition, additional Service Information (SI), a set of tables adhering to the MPEG private section syntax, may be incorporated into the TS. This enables a receiver device to correctly process the data contained within the TS.

Aspects of the present invention, however, are also is applicable to other traditional digital mobile broadcast systems such as, for example, T-DAB, T/S-DMB, ISDB-T, ATSC, MediaFLO, and non-traditional systems such 3GPP MBMS and 3GPP2BCMCS.

The broadcast network 114 may include a radio transmission of IP datacasting over DVB-H. The broadcast network 114 may broadcast a service such as a digital or analog television signal and supplemental content related to the service via transmitter 118. The broadcast network may also include a radio, television or IP datacasting broadcasting network. The broadcast network 114 may also transmit supplemental content which may include a television signal, audio and/or video streams, data streams, video files, audio files, software files, and/or video games. In the case of transmitting IP datacasting services, the service source 122 may communicate actual program content to user device 112 through the broadcast network 114 and additional information such as user right and access information for the actual program content through the cellular network 116 or utilizing both networks.

The mobile device 112 may also contact the service source 122 through the cellular network 116. The cellular network 116 may comprise a wireless network and a base transceiver station transmitter 120. The cellular network may include a second/third-generation (2G/3G) cellular data communications network, a Global System for Mobile communications network (GSM), a Universal Mobile Telecommunications System (UMTS) or other wireless communication network such as a WLAN network.

In one aspect of the invention, mobile device 112 may comprise a wireless interface configured to send and/or receive digital wireless communications within cellular network 116. The information received by mobile device 112 through the cellular network 116 or broadcast network 114 may include user selection (for example, in an interactive transmission), applications, services, electronic images, audio clips, video clips, and/or WTAI (Wireless Telephony Application Interface) messages. As part of cellular network 116, one or more base stations (not shown) may support digital communications with receiver device 112 while the receiver device is located within the administrative domain of cellular network 116.

Figure 2:
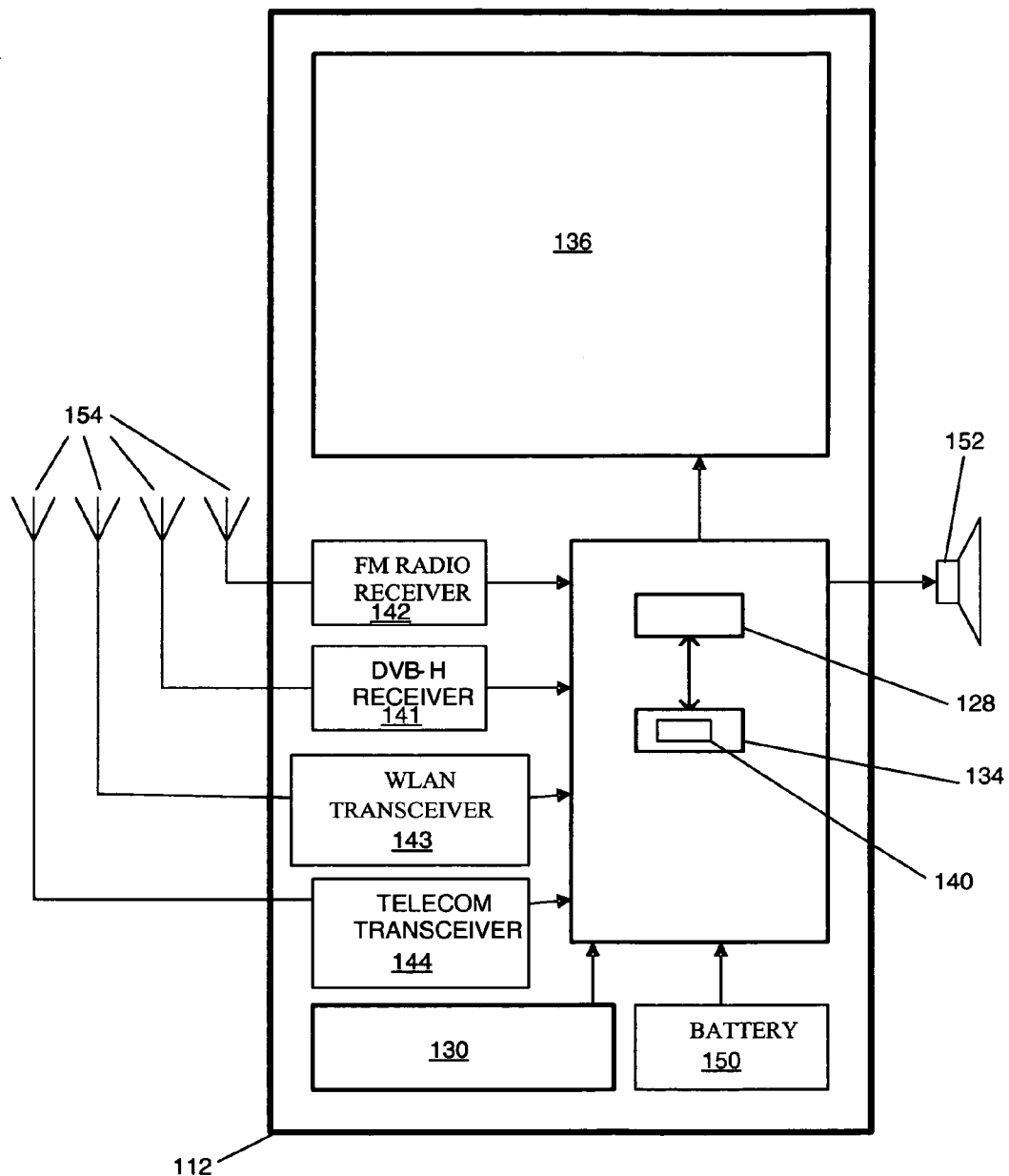
FIG. 2 illustrates a suitable digital broadcast receiver in which one or more illustrative embodiments of the invention may be implemented.

As shown in FIG. 2, mobile device 112 may include processor 128 connected to user interface 130, memory 134 and/or other storage, and display 136. Mobile device 112 may also include battery 150, speaker 152 and antennas 154. User interface 130 may further include a keypad, touch screen, voice interface, four arrow keys, joy-stick, data glove, mouse, roller ball, touch screen, or the like.

Computer executable instructions and data used by processor 128 and other components within mobile device 112 may be stored in a computer readable memory 134. The memory may be implemented with any combination of read only memory modules or random access memory modules, optionally including both volatile and nonvolatile memory. Software 140 may be stored within memory 134 and/or storage to provide instructions to processor 128 for enabling mobile device 112 to perform various functions. Alternatively, some or all of mobile device 112 computer executable instructions may be embodied in hardware or firmware (not shown).

Mobile device 112 may be configured to receive, decode and process digital broadband broadcast transmissions that are based, for example, on the Digital Video Broadcast (DVB) standard, such as DVB-H, DVB-T or DVB-MHP, through a specific DVB receiver 141. The mobile device may also be provided with other types of receivers for digital broadband broadcast transmissions. Additionally, receiver device 112 may also be configured to receive, decode and process transmissions through FM/AM Radio receiver 142, WLAN transceiver 143, and telecommunications transceiver 144. In one aspect of the invention, mobile device 112 may receive radio data stream (RDS) messages.

In an example of the DVB standard, one DVB 10 Mbit/s transmission may have 200, 50 kbit/s audio program channels or 50, 200 kbit/s video (TV) program channels. The mobile device 112 may be configured to receive, decode, and process transmission based on the Digital Video Broadcast-Handheld (DVB-H) standard or other DVB standards, such as DVB-MHP, DVB-Satellite (DVB-S), DVB-Terrestrial (DVB-T) or DVB-Cable (DVB-C). Similarly, other digital transmission formats may alternatively be used to deliver content and information of availability of supplemental services, such as ATSC (Advanced Television Systems Committee), NTSC (National Television System Committee), ISDB-T (Integrated Services Digital Broadcasting-Terrestrial), DAB (Digital Audio Broadcasting), DMB (Digital Multimedia Broadcasting), FLO (Forward Link Only) or DIRECTV. Additionally, the digital transmission may be time sliced, such as in DVB-H technology. Time-slicing may reduce the average power consumption of a mobile terminal and may enable smooth and seamless handover. Time-slicing consists of sending data in bursts using a higher instantaneous bit rate as compared to the bit rate required if the data were transmitted using a traditional streaming mechanism. In this case, the mobile device 112 may have one or more buffer memories for storing the decoded time sliced transmission before presentation. The power of receiver between bursts may be turned off to reduce power consumption.

In one example of the present invention, ESG fragments may be delivered to a subscriber terminal in one or more data streams or channels. In this example, a plurality of channels (such as IP-packet streams) can be used to deliver ESG information to the subscriber terminal. For example, the ESG fragment may provide the subscriber terminal with notification of upcoming events to be provided by a service provider, changes in current events provided by a service provider or updated or on-going information for a user or group of users.

Figure 3:
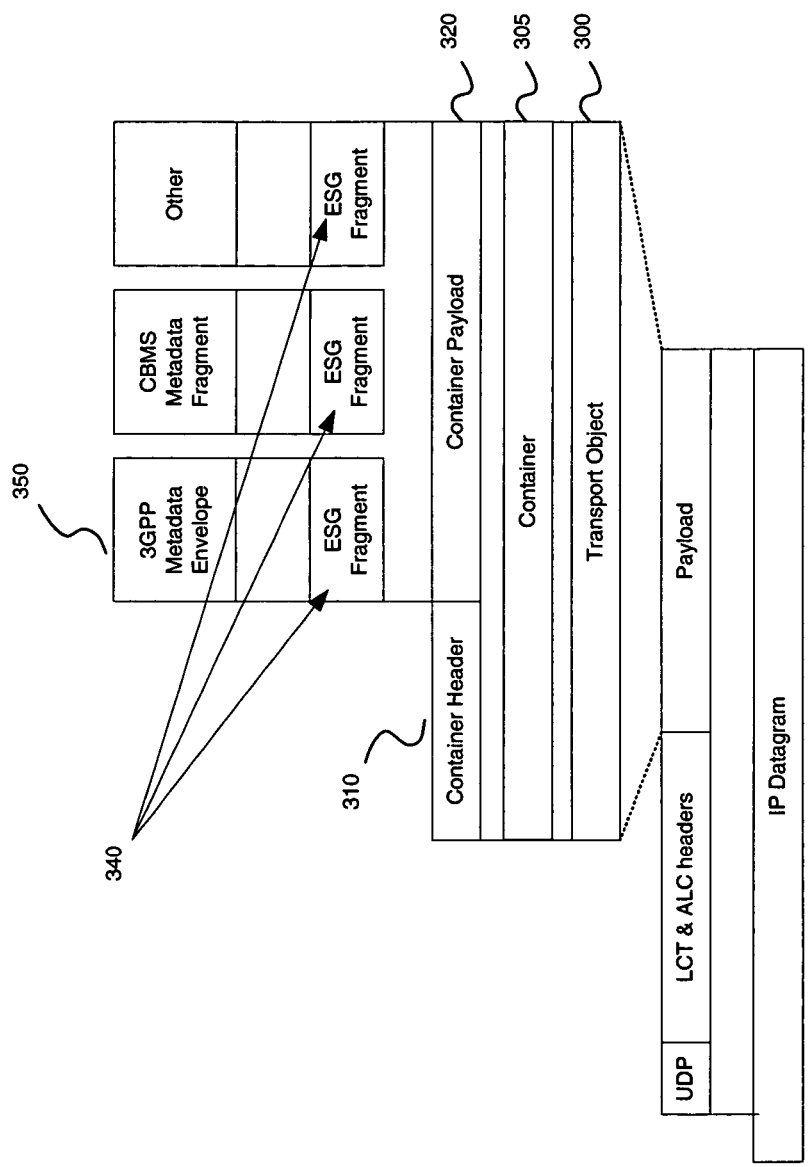
FIG. 3 illustrates a schematic diagram of an example of a transport object in which one or more illustrative embodiments of the invention may be implemented.

ESG fragments may be delivered in a transport object which may transport ESG information in a container. Thus, ESG fragments may be placed in a container that may be delivered in its own transport object. The container may further include a container header and a container payload, for example, in which the container header may provide information on where each container is located within the transport object. In one example, the transport object may contain a single container or a plurality of containers, each container including at least one ESG fragment. FIG. 3 is a diagram of an example transport object in accordance with at least one aspect of the present invention. As illustrated in the example of FIG. 3, a transport object 300 may comprise a container that may include a container header 310 and a container payload 320. In one example, the container header 310 and the container payload 320 are incorporated into a single container 305 which may be incorporated into a single transport object 300 so that the container header 310 need not be recombined with information regarding where each container is located within different transported objects. Alternatively, the transport object 300 may contain a plurality of containers and a container may contain any number of ESG fragments 340. The container header 310 may contain information associated with a corresponding ESG fragment such as, for example, information regarding the container header 310 itself and/or the container payload 320.

In the example illustrated in FIG. 3, the ESG fragment 340 is contained in the container payload 320. The container header 310 may contain descriptors for identifying and describing ESG fragments in the corresponding container payload 320. Thus, the characteristics of the ESG fragment may be identified, such as but not limited to the position of the ESG fragment in the transport object 300 or the length of each contained ESG fragment 340. For example, in one embodiment, a field specifies where the particular ESG begins within the container payload 320 by providing, for example, an offset value, start and end points, or the like. In other embodiments, metadata 350 may be associated with the individual ESG fragments 340, located within or proximate to the header 310, descriptor entries, an ESG fragment 340 or a mixture thereof. In one exemplary embodiment, the association of a 3GPP metadata envelope with an ESG fragment 340 may substitute for, or negate the need of additional metadata to be located in the header 310 in relation to that particular ESG fragment.

Figure 4:
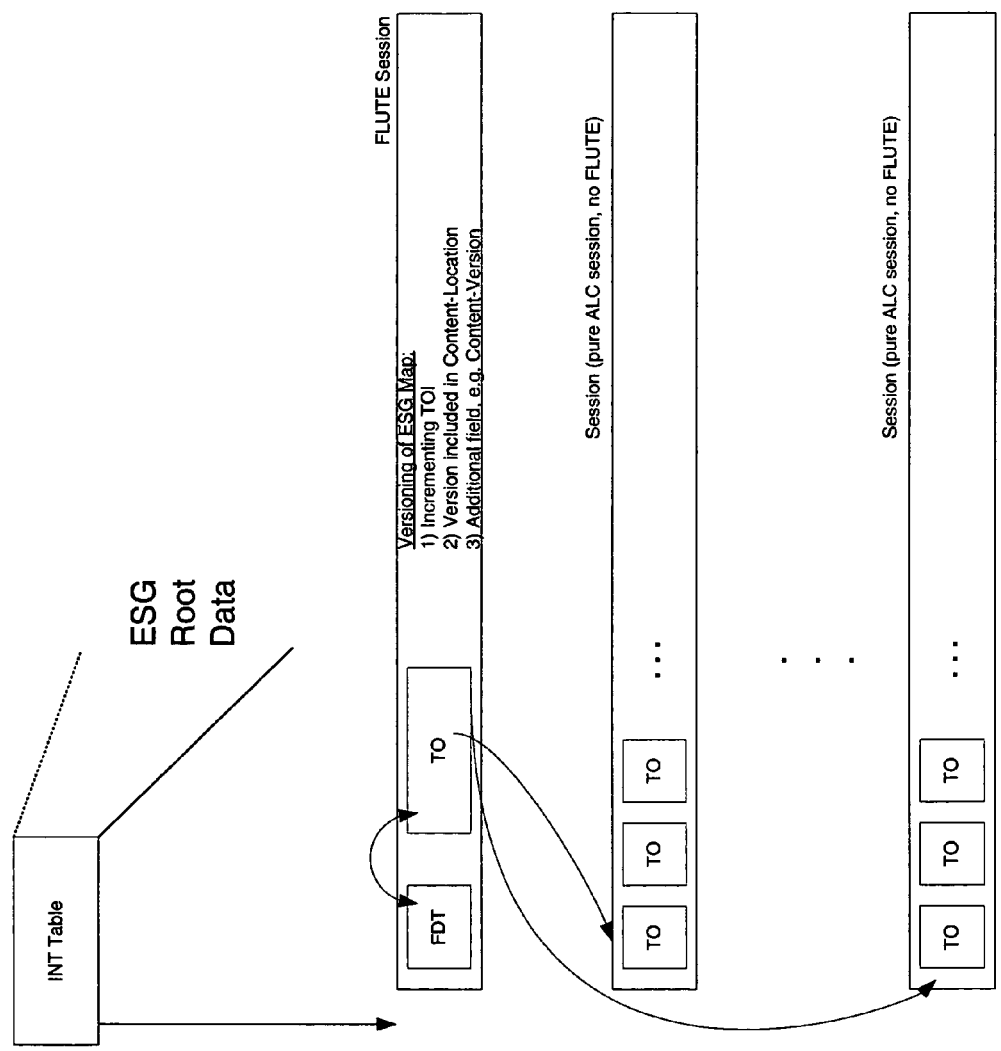
FIG. 4 illustrates examples of transporting single transport objects in which one or more illustrative embodiments of the invention may be implemented.

FIG. 4 illustrates an example of transmitting a plurality of single Transport Objects. As illustrated in FIG. 4, the Transport Objects (TO) of the current invention may be carried in, for example, FLUTE (File Delivery over Unidirectional Transport) sessions, or a pure Asynchronous Layered Coding (ALC) session. In the example of FIG. 4, the ESG Root Channel data, such as IP Address, port number and Transport Session Identifier (TSI), are announced in the IP/MAC Notification Table (INT Table) which may be, for example, carried in the SI/PSI stream in DVB-H as one of the SI tables of DVB-H. The FLUTE session of the ESG Root Channel comprises a File Delivery Table (FDT) of the session and one or more Transport Objects (TO). These Transport Objects that may be delivered in announcement carousels contain mapping between the different parts of ESGs and access parameters to the different ESG methods in which the ESG data is transmitted. The ESGs may differ from each other. For example, ESGs may be in different languages, genres or encoding.

Examples of access parameters may include, for example, IP addresses, port numbers, TSIs, start and end times etc. The FLUTE session thus declares how the ESG data is distributed to different sessions. The TOs of the FLUTE session carrying this mapping data are described in the FDT of the FLUTE session. The ESG mapping data may be delivered in one or multiple TOs. The mapping can be made using XML Schema, plain ASCII text, Structured ASCII text such as multipart MIME or MIME headers, as binary with enumerated types or through various other means as is known in the art. The ESG data is in this example may be delivered in one or more TOs, which may be within pure ALC sessions, for example. The ESG data or parts of it may be delivered in some embodiments of the invention in one or more FLUTE sessions in addition to or instead of ALC sessions.

Mobile broadcast services enables distribution of rich, interactive media content to a large mobile audience. Such services can be carried over a number of different broadcast networks such as DVB-T, DVB-H, Qualcomm FLO, T-DMB, S-DMB, WLAN, WiMAX, 3GPP/MBMS, 3GPP2/BCMCS, to name a few. In addition, the network may be combined with an interactive service such that 2G, 2.5G and 3G cellular systems, WLAN, etc.

In one example of one aspect, information on interactive services may be provided in an ESG. This information may include a parameter for indicating the type of broadcast service. In addition, the information may further include a parameter for indicating the type of interaction provided corresponding to the service. For example, a parameter may be provided in an ESG that may indicate that a service being provided is an interactive service. Some non-limiting examples of interactive services include interactive basic TV, interactive Clipcast, interactive basic radio, interactive file download services, or interactive software management services, to name a few.

In another example, the parameter indicating the type of broadcast service may be separate from the parameter indicating the type of interactive service. For example, a television program, such as "American Idol" may be broadcast. The ESG corresponding to the "American Idol" television program may contain a broadcast type parameter indicating the program to be a Basic TV type of service. In addition, the ESG may include a parameter indicating the interaction of the program to be, for example, a messaging type. The messaging type may be any type. In this example, the messaging type may be SMS such that an indication of the SMS type of interaction may be provided in the program. In one example, a display may provide the program (i.e., "American Idol") with an indication of voting over SMS (i.e., the type of interaction in this example is SMS).

Also, one service or program may have more than one type of broadcast service or more than one type of interaction. As an example, a service may include a broadcast component (e.g., a television program) and a related service may provide a file download service component. In this example, the broadcast type of the first program may be a Basic TV type and the type of interaction may be SMS while the broadcast of the second service or program may be a file download service and the type of interaction of the second service or program may be a www interactivity type.

In an example of the indication of the type of interaction being separate from the indication of the type of service, a parameter in an ESG is provided for indicating the type of broadcast provided. For example a parameter such as "BroadcastType" may provide the indication of the type of service. In one example, the BroadcastType parameter may be an integer, the value of which may indicate the specific type of broadcast provided, For example, the BroadcastType parameter may be an integer indicating the broadcast is a Basic TV broadcast or a Basic Radio broadcast. Other non-limiting examples of broadcast types include Clipcast, File download services, software management services, notification, to name a few.

Also in this example, a parameter may be provided in an ESG for indicating the type of interaction. This parameter may be separate from the parameter in the ESG indicating the type of broadcast or service provided. The parameter indicating the type of service may indicate that any type of interaction is available with the service provided. Alternatively, the parameter may indicate that the interaction type is SMS messaging, MMS messaging, E-mail messaging, service guide update, or world wide web (www) service, to name a few. Any type of interaction type may be included and the present invention is not limited to the examples provided. For example, the interaction type may also include standardized types (e.g., WAP) or proprietary types in implementation (e.g., enumeration number 204 for Yahoo messenger or 205 for an IRC Channel). In one example, the parameter is an integer, the value of which indicates the type of interaction. Also, the interactivity parameter may be included in the metadata of the ESG, if desired.

The following Table I indicates an example of parameters that may be included in an ESG to indicate the type of service:

TABLE I

| Name | Type | Category | Cardinality | Description | Data Type |
|---|---|---|---|---|---|
| BroadcastType | A | M | 0 . . . N | Type of the service. Allowed values are:<br>0 - unspecified<br>1 - Basic TV<br>2 - Basic Radio<br>4 - Clipcast<br>5 - File download services<br>6 - Software management services<br>7 - Notification<br>8 - 200 reserved for future use<br>201 - 255 reserved for proprietary use | Integer (8 bits) |

Where the type can be an Element (E), an Attribute (A), a first level sub-element (E1), a second level sub-element (E2), or a third level sub-element (E3) and the category can be optional (O) or preferred/mandatory (M).

In addition, the following Table 2 indicates an example of a parameter that may be included in an ESG to indicate the type of interaction of a service:

TABLE 2

| Name | Type | Category | Cardinality | Description | Data Type |
|---|---|---|---|---|---|
| InteractionType | A | O | 0 . . . N | Type of the service. Allowed values are:<br>0 - unspecified<br>1 - Any Interaction<br>2 - Messaging - SMS<br>3 - Messaging - MMS<br>4 - Messaging - E-mail<br>5 - Service Guide update<br>6 - www services<br>7 - 200 reserved for future use<br>201 - 255 reserved for proprietary use | Integer (8 bits) |

Where the type can be an Element (E), an Attribute (A), a first level sub-element (E1), a second level sub-element (E2), or a third level sub-element (E3) and the category can be optional (O) or preferred/mandatory (M).

Hence, in this example, the parameter indicating the type of broadcast or service (e.g., BroadcastType parameter) may be separate from the parameter indicating the type of interactivity of the broadcast or service (e.g., InteractionType parameter). Thus, additional possible combinations may be included through the two aspects of the service type indicated in the parameters of the ESG. As one example to illustrate, a TV program, for example "American Idol", may have a broadcast type of Basic TV. However, the "American Idol" program may further contain interactivity to support viewer voting. The type of interaction may be indicated as, for example, any interaction, a messaging type of interaction, a service guide update interaction or a www services interaction, for example. In addition, messaging interaction may be any type of messaging interaction such as SMS, MMS or E-mail. In this case, the type of interaction may be, for example, SMS and the InteractionType parameter may have a value corresponding to the SMS type of interactivity. Thus, an icon or other display may be displayed to the user indicating support for viewing over SMS (i.e., the InteractionType parameter may have a value corresponding to SMS interaction type).

The interaction type may further include an indication of www services. For example, the InteractionType parameter may have a value corresponding to an interaction type of "www services". For example, a radio program may have a broadcast type parameter indicating the program broadcast to be a radio broadcast (e.g., the broadcastType parameter may indicate the program to be a Basic Radio program). The radio program may further include a link to radio www pages (e.g., InteractionType parameter may have a value indicating that the interactivity type is www).

In another example, interactivity and type of broadcast may be provided in a single parameter or attribute in the ESG. For example, a parameter may be provided in the ESG that indicates both the type of service or program and the type of interaction corresponding to the service or program. For example, a parameter, element or attribute may be provided in an ESG for indicating a type of service (e.g., Basic TV, Clipcast, Basic Radio, File download services or software management services, to name a few). In addition, the parameter may also indicate the interaction type of the program or service (e.g., www services, SMS messaging, MMS messaging, E-mail messaging, service guide updating, etc.). Also, the service may provide more than one value for the service through the parameter or attribute. For example, plain interactive services may be provided as well as file download services including interaction.

The following Table 3 indicates an example of parameters that may be included in an ESG to indicate the type of service:

Where the type can be an Element (E), an Attribute (A), a first level sub-element (E1), a second level sub-element (E2), or a third level sub-element (E3) and the category can be optional (O) or preferred/mandatory (M).

In another example, type of broadcast or service may be provided in which the service has one type. A parameter or element may be provided in the ESG corresponding to a program or service that may indicate the type of service and the type of interaction of the broadcast. For example, a parameter may be included in an ESG that has a value corresponding to a Basic TV type of service, a Clipcast type of service, a mixed type of service (e.g., mixed Basic TV and Clipcast type of service), a Basic Radio service, a File Download services type, a software management service, or a notification service. In addition, the parameter or element may have a different value depending on the type of interactivity associated with the service. For example, an interactive Basic TV service may have a corresponding parameter or element with a certain value whereas the parameter for a non-interactive Basic TV service may have a different value to indicate the type of interaction as well as the type of service provided.

In this example, the parameter or element may further have a unique value based on the type of associated interaction. For example, the parameter or element may have a particular value to indicate the type of interactivity as SMS messaging, a different value to indicate the type of interactivity as MMS messaging, and yet a different value to indicate the type of interactivity as E-mail messaging. There are many types of interactivity that may be included and any type of interactivity may be indicated by a unique value of the parameter or element. For example, interactivity may also include www interactivity services or on-demand interaction.

In another example, the parameter or element may have a unique value to indicate both the type of service and the type of interactivity or if interactivity is offered. For example, the parameter or element may have a particular value for interactive Basic TV, a different value for Clipcast service, a different value for basic radio service with interactive SMS messaging, etc. Thus, the value of the parameter or element may indicate the type of service as well as the type of interactivity, if any.

TABLE 3

| Name | Type | Category | Cardnality | Description | Data Type |
|------|------|----------|------------|-------------|-----------|
| Type | A | M | 1...N | Type of the service. Allowed values are:<br>0 - unspecified<br>1 - Basic TV<br>2 - Clipcast<br>3 - Basic Radio<br>4 - File download services<br>5 - Software management services<br>6 - Notification (added in OMA Sydney meeting in Oct 17-21 2005)<br>7 - Interaction - www<br>8 - Interaction - messaging: MMS<br>9 - Interaction - Messaging: SMS<br>10 - Interaction - Messaging: E-mail<br>11 - Interaction - Service Guide Update<br>12 - 200 reserved for future use<br>201 - 255 reserved for propriatery use | Integer (8 bits) |

In addition, the parameter or element may also indicate only the interactivity type. For example, the value of the parameter or element may indicate the interaction as www, MMS messaging, SMS messaging, E-mail messaging or Service Guide Update interaction.

The following Table 4 indicates an example of parameters that may be included in an ESG to indicate the type of service and the type of interactivity:

TABLE 4

| Name | Type | Category | Cardnality | Description | Data Type |
|------|------|----------|------------|-------------|-----------|
| Type | A | M | 1 | Type of the service. Allowed values are:<br>0 - unspecified<br>1 - Basic TV, non-interactive<br>2 - Basic TV, interactive<br>3 - Basic TV, interactive - messaging: SMS<br>4 - Basic TV, interactive - messaging: MMS<br>5 - Basic TV, interactive - messaging: E-mail<br>6 - Basic TV, interactive - www<br>7 - Clipcast<br>8 - Mixed Basic TV and Clipcast non-interactive<br>9 - Mixed Basic TV and Clipcast, with interaction<br>10 - Mixed Basic TV and Clipcast, with interaction - messaging: SMS<br>11 - Mixed Basic TV and Clipcast, with interaction - messaging: MMS<br>12 - Mixed Basic TV and Clipcast, with interaction - messaging: E-mail<br>13 - Mixed Basic TV and Clipcast, with interaction - www<br>14 - Basic Radio, non-interactive<br>15 - Basic Radio, interactive<br>16 - Basic Radio, interactive - messaging: SMS<br>17 - Basic Radio, interactive - messaging: MMS<br>18 - Basic Radio, interactive - messaging: E-mail<br>19 - Basic Radio, interactive - www<br>20 - File download services, non-interactive (subscription based auto-delivery)<br>21 - File download services, interactive (on-demand)<br>22 - File download services, interactive - messaging: SMS<br>23 - File download services, interactive - messaging: MMS<br>24 - File download services, interactive - messaging: E-mail<br>25 - File download services, interactive - www<br>26 - Software management services, non-interactive (subscription based auto-delivery)<br>26 - Software management services interactive (on-demand)<br>26 - Software management services, interactive - messaging: SMS<br>26 - Software management services, interactive - messaging: MMS<br>26 - Software management services, interactive - messaging: E-mail<br>26 - Software management services, interactive - www<br>27- Notification (added in OMA Sydney meeting in Oct 17-21 2005)<br>28 - Interaction<br>29 - Interaction - www<br>30 - Interaction - messaging: MMS<br>31 - Interaction - Messaging: SMS<br>32 - Interaction - Messaging: E-mail<br>33 - Interaction - Service Guide Update<br>34 - 200 reserved for future use<br>201 - 255 reserved for proprietary use | Integer (8 bits) |

Where the type can be an Element (E), an Attribute (A), a first level sub-element (E1), a second level sub-element (E2), or a third level sub-element (E3) and the category can be optional (O) or preferred/mandatory (M).

Figure 5:
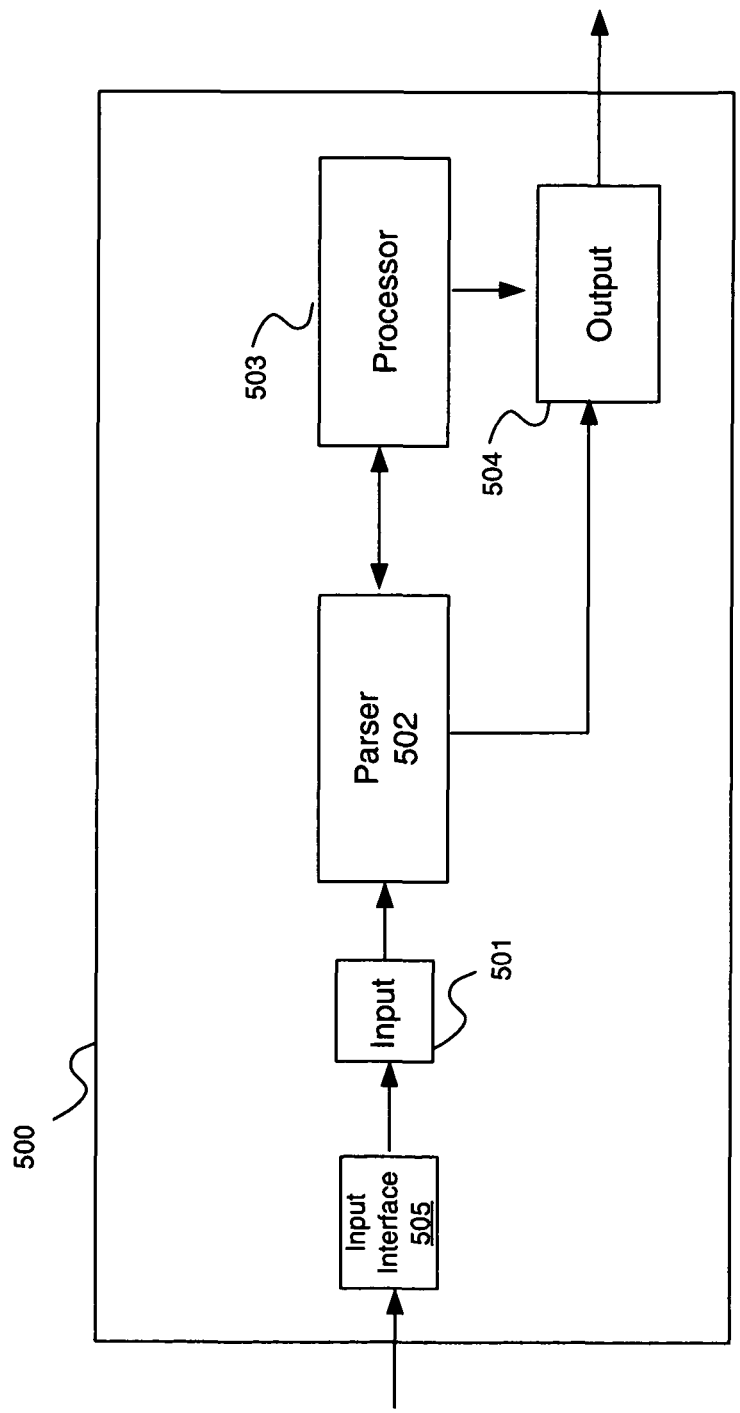
FIG. 5 illustrates an example of a receiver in which one or more illustrative embodiments of the invention may be implemented.

FIG. 5 is a partial block diagram illustrating an example of a receiver or terminal according to one aspect of the present invention. In this example, the receiver 500 contains an input 501. The input 501 may be configured to receive information transmitted as an ESG fragment or transmitted using an ESG fragment transportation mechanism. Alternatively, the ESG fragment may also be received through an interface. As FIG. 5 illustrates, an input interface 505 may receive the ESG, for example, over a bidirectional interaction network. In this example, an ESG fragment may contain a parameter for indicating a type of corresponding broadcast. In one example, the type of broadcast is a Basic TV broadcast. In another example, the type of broadcast is a Clipcast broadcast. However, any type of program or service may be indicated. For example, a program or service may be provided that is a Basic Radio program or service, a File Download service, a software management service, a notification service, etc.

The ESG fragment may further include a parameter for indicating a type of interaction associated with the corresponding program or service. For example, an ESG fragment may be received at the input 501. In addition, the ESG fragment may be received at the input 501 via the input interface 505. The ESG fragment may include a parameter for indicating a type of broadcast or program or service. In addition, the ESG fragment may include a parameter for indicating a type of interaction associated with the broadcast, program or service. In one example, the parameter for indicating a type of broadcast, program or service includes a BroadcastType parameter or attribute that has a value corresponding to a type of program or service. For example, the BroadcastType parameter or attribute may have a value indicating the type of service as a Basic TV broadcast, a Basic Radio broadcast, Clipcast broadcast, file download services, etc.

The ESG fragment received at the input 501 may further include a parameter for indicating a type of interaction associated with the program or service. For example, the parameter indicating the type of interaction may include an InteractionType parameter or attribute that has a value corresponding to the type of interaction or interactivity associated with the program or service. In one example, the InteractionType parameter or attribute has a value corresponding to a messaging interaction. In another example, the InteractionType parameter has a value corresponding to a service guide update or www services. In addition, the InteractionType parameter or attribute may have a value a avalue corresponding to specific type of messaging interaction. Some non-limiting examples of types of messaging interaction include SMS, MMS, or E-mail messaging.

Alternatively, the input 501 of the receiver 500 may receive an ESG containing a single parameter or attribute for indicating the type of program or service and the type of interaction associated with the program or service. In this example, an ESG fragment is received at the input 501 of the receiver 500. In one example, the ESG fragment may be received via an input interface 505. The ESG fragment received may include a parameter or attribute having a value corresponding to the type of program or service and/or the type of interactivity associated with the program or service. For example, the parameter or attribute may be a Type attribute that has a value corresponding to a Basic TV type of service, a Clipcast type of service, a Basic Radio type of service, a File download type of service, etc. Alternatively, the parameter or attribute may have a value indicating the type of interaction associated with the program or service. For example, the parameter or attribute (e.g., Type attribute) may have a value indicating the type of interaction as messaging, service guide update, etc. In addition, the parameter or attribute may have a value indicating a specific type of messaging interaction (e.g., MMS, SMS, or E-mail, to name a few).

In another example, the input 501 of the receiver 500 may receive an ESG fragment containing a parameter or attribute that may indicate the type of program or service and the type of interaction associated with the program or service. In this example, the parameter or attribute (e.g., a Type attribute) may have a value corresponding to a Basic TV type of service with interactive messaging or may have a value corresponding to a Basic Radio service that is non-interactive or is interactive through www services. Any combination of service or program type and interaction type may be indicated by the parameter or attribute. Hence, in this example, the input 501 of the receiver 500 may receive an ESG fragment that contains an attribute the value of which may indicate the type of service or program and the type of interactivity associated with the service or program.

The receiver 500 may further include a parser 502 for identifying parameters in an ESG fragment associated with the type of program or service and/or the type of interaction associated with the program or service. For example, the parser may identify a parameter or attribute indicating the type of broadcast, program or service. The parameter (e.g., a BroadcastType attribute) may have a value corresponding to a particular type of broadcast (e.g., Basic TV, Basic Radio, Clipcast, etc.). The parser 502 may further identify a parameter in the ESG fragment for indicating a type of interaction associated with the broadcast (e.g., an InteractionType parameter or attribute). The parameter or attribute indicating the type of interaction (e.g., InteractionType parameter) may have a value corresponding to a type of interaction(e.g., messaging, service guide update, www services, SMS messaging, MMS messaging, E-mail messaging, etc.).

The receiver 500 may further include a processor 503 for controlling or instructing the parser 502 for identifying a corresponding parameter from within the ESG fragment to identify the type of broadcast, program or service or the type of interaction associated with the broadcast, program or service. Data corresponding to the broadcast type or interaction type may be output by output 504. For example, the data may be displayed for the user or subscriber.

In one example, an ESG fragment is received at the input 501 of the receiver 500. The ESG fragment is optionally received at the input 501 via the input interface 505. The ESG fragment in this example contains a parameter or attribute (e.g,. a BroadcastType attribute) that has a value corresponding to an indication of the type of broadcast as Basic TV. For example, a program such as "American Idol" is provided corresponding to the ESG fragment received at the input 501 of the receiver 500. The "American Idol" Basic TV program has an associated interaction—e.g., viewer voting. The ESG fragment corresponding to the "American Idol" program also includes a parameter or attribute (e.g., InteractionType attribute) that has a value indicating the interaction type of messaging interaction. As one example of messaging interaction, the ESG fragment may indicate the type of messaging interaction to be SMS messaging interactivity.

The parser 502 receives the ESG fragment from the input 501 and parses the ESG fragment to identify parameters or attributes. In this example, the parser 502 identifies the BroadcastType attribute and the InteractionType attribute in the ESG fragment. The processor 503 further controls the parser 502 in identifying the parameters or attributes in the ESG fragment. Based on the parameters or attributes identified in the ESG fragment, the corresponding program may be displayed at the output 504. In this example, the type of program ("American Idol", Basic TV) as determined by the identified BroadcastType attribute in the ESG fragment is displayed on a display (e.g., output 504). Also displayed at the output 504 may be an indicating for voting over SMS messaging as indicated by the InteractionType attribute. In other words, the viewer is alerted to the fact that voting via SMS is available for this program.

Figure 6:
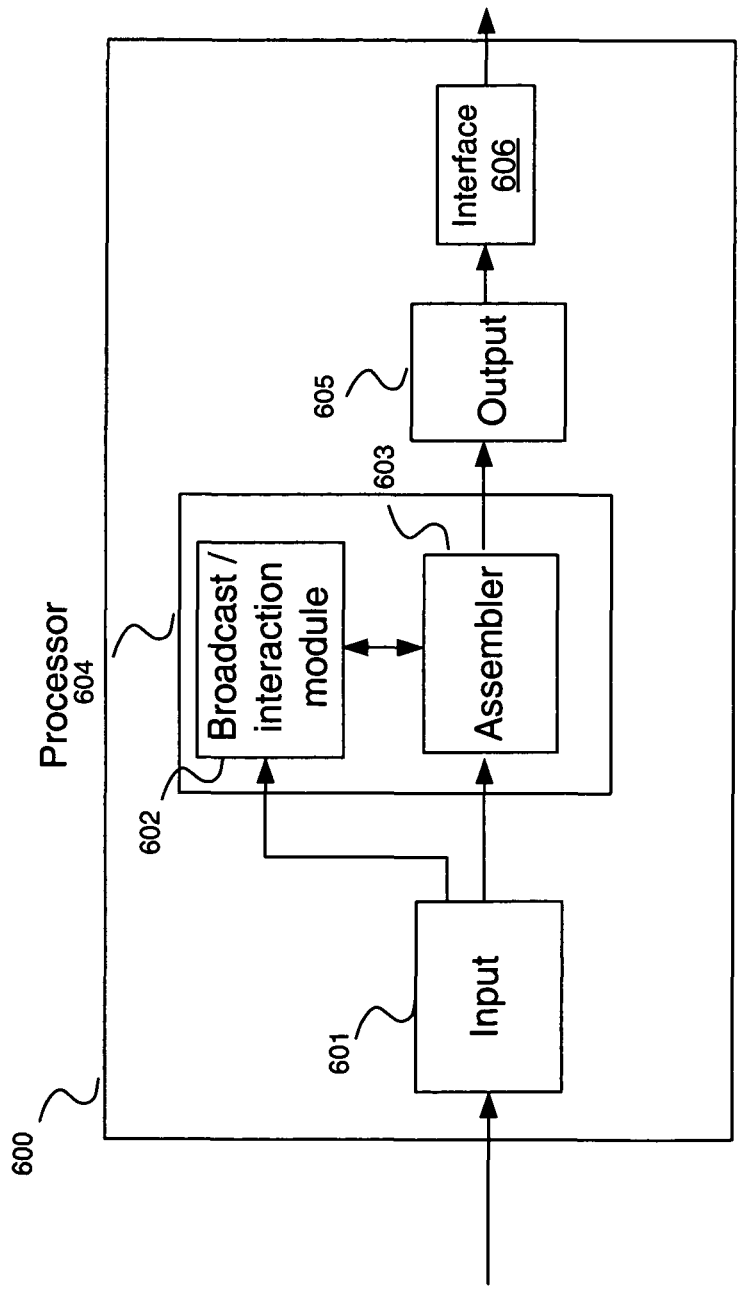
FIG. 6 illustrates an example of a transmitter in which one or more illustrative embodiments of the invention may be implemented.

FIG. 6 is a partial block diagram illustrating an example of a transmitter according to one aspect of the present invention. In this example, the transmitter 600 includes an input 601 for receiving data to be included in an ESG fragment for transmission. This data may be received from a variety of sources, for example, a service provider or broadcaster. The transmitter 600 may further include a processor 604 for assembling or processing an ESG fragment corresponding to a program or service. FIG. 6 illustrates the processor 604 as containing a broadcast/interaction module 602 and an assembler 603. However, any of these components may be separate from the processor 604, if desired.

The broadcast/interaction module 602 may determine broadcast/interaction types associated with the program or service corresponding to the ESG fragment. For example, a service provider may provide a broadcast, program or service of a particular type (e.g., Basic TV, Basic Radio, Clipcast, etc.) or a program or service associated with a type of interaction (e.g., messaging, SMS, MMS, E-mail, service guide update, etc.). The type of program or service and/or type of interaction associated with the program or service may be indicated in the ESG fragment by parameters or attributes included in the ESG fragment. The parameter or attribute indicating the type of program or service or interaction associated with the program or service may be transmitted in the ESG fragment to terminals or receivers. Thus broadcast and or interaction type information may be transmitted to the transmitter 600 and may be processed within the broadcast/ interaction module 602 to be included in a service guide or ESG fragment.

The transmitter 600 may further include an interface for interfacing with a broadcast distribution system or network. For example, the transmitter may include an interface 606. In one example, a service guide is transmitted to a receiver or group of receivers from the transmitter 600 in which user interaction at the receiver or group of receivers is not provided (e.g., the type of interaction may be indicated as non-interactive). In this example, the transmitter may transmit the service guide via an interface 606 corresponding to non-interactive services or programs.

In one example, the transmitter 600 processes the service guide to include a parameter or attribute indicating a type of service or program. In this example, the assembler 603 assembles a service guide for transmission over a network to a receiver or group of receivers. In this example, a parameter or attribute (e.g., BroadcastType attribute) may be included in the service guide or ESG fragment indicating the type of program or service corresponding to the service guide or ESG fragment. The assembler 603 may create the ESG fragment including including the type attribute (e.g., BroadcastType attribute). In this example, the type attribute may have a value indicating Basic TV, Radio TV, Clipcast, File download services, etc. The assembler 603 may further include in the ESG fragment or service guide a parameter or attribute for indicating a type of interaction associated with the corresponding program or service. For example, the assembler 603 may include an InteractionType attribute in the service guide or ESG fragment with a value corresponding to a type of interaction (e.g., SMS messaging, MMS messaging, service guide update, www services, etc.).

In one example, the service provider may provide a Basic Radio program or service. This may be, for example, a morning radio program which may be transmitted to a receiver or group of receivers. The ESG corresponding to the radio program may be created in a transmitter to include a parameter or attribute for indicating the type of program or service. In this example, the ESG fragment may contain a BroadcastType attribute for indicating the type of the program to be a Basic Radio program. The radio program may be received via the input 601 of the transmitter. Also, the transmitter 600 may receive at the input 601 information from the service provider indicating the program type (e.g., indicating the type of the program as Basic radio). For example, the service provider may provide a parameter or attribute, such as a BroadcastType attribute to include in the ESG fragment and for indicating the corresponding program as a Basic Radio program.

In addition, the transmitter 600 may receive via input 601 from the service provider an interaction component of the program or service from the service provider. For example, the radio show may include a link to a web (i.e., www) pages. Hence, the program of type Basic Radio may also have an interactive component in which a user may access a corresponding web page through a link. The broadcast/interaction module may process the information received from the service provider and may include a parameter or attribute corresponding to the interaction component of the associated program or service. In this example, the broadcast/interaction module provides an InteractivityType attribute corresponding to the interactivity type of "www services", for example, to the assembler 603. The assembler receives the BroadcastType attribute and the InteractivityType attribute and includes the attributes in the ESG fragment. The ESG fragment, containing the parameters or attributes indicating the type of broadcast and/or type of interaction associated with the program or service may be transmitted via an output 605 to a receiver or group of receivers. Also, the output may provide the ESG fragment via an interface 606 with the network as illustrated in FIG. 6. In one example, the parameters or attributes indicating the type of program or service and/or the type of interaction associated with the program or service may be included in the metadata of the ESG fragment.

FIG. 7 is a flowchart illustrating an example of transmitting a service guide containing a parameter or attribute for indicating a type of program or service and/or a type of interaction associated with the program or service. In this example, a service guide or ESG fragment is created in STEP 702. For example, a transmitter may create an ESG fragment containing information pertaining to a corresponding program or service which may include a type of program or service and/or a type of interaction associated with the program or service to a receiver or group of receivers. The ESG fragment may include, for example, a parameter or attribute for indicating a type of broadcast (e.g., BroadcastType attribute). The BroadcastType attribute, for example, may have a value corresponding to a type of program or service (e.g., Basic TV, Basic Radio, Clipcast, file Download services, Software Management services, notification services, etc.) (STEP 703). This parameter or attribute may be added to the ESG fragment or service guide for indicating the type of the corresponding program or service (STEP 703). In one example, the parameter or attribute may be an integer value corresponding to an indication of the program or service type.

The ESG fragment may further include a parameter or attribute for indicating a type of interaction associated with the corresponding program or service (STEP 704). As one example, the parameter or attribute for indicating a type of interaction may be an InteractionType attribute that may have a value corresponding to a designated type of interaction. For example, the InteractionType attribute may have a value corresponding to SMS messaging interaction, MMS messaging interaction, E-mail messaging interaction, Service Guide update interaction or www services interaction, to name a few (STEP 704).

In STEP 705, the ESG fragment is transmitted to a terminal or receiver. The terminal or receiver may thus receive a parameter or attribute for indicating the type of program or service and/or the type of interaction associated with the program or service corresponding to the ESG fragment.

FIG. 8 is a flowchart illustrating an example of a receiver or terminal receiving a parameter or attribute in an ESG fragment indicating a type of program or service and/or a type of interaction associated with the program or service. In STEP 801 of this example, the terminal or receiver receives an ESG fragment. In STEP 802, a parser at the terminal may parse the ESG fragment for data associated with the type of program or service and/or the type of interaction associated with the program or service. The ESG fragment may contain, for example, a parameter or attribute for indicating a type of program or service. In one example, the parameter or attribute is a BroadcastType attribute that has a value corresponding to a type of program or service (e.g,. Basic TV, Basic Radio, etc.) (STEP 803).

The ESG fragment may further include a parameter or attribute indicating the type of interaction associated with the program or service. In one example, the parameter or attribute is an InteractionType attribute that has a value corresponding to a type of interaction associated with the program or service. For example, the InteractionType parameter may indicate an SMS messaging interaction, MMS messaging interaction, E-mail messaging, Service Guide Update, etc. (STEP 804).

In STEP 805, parameters or attributes indicating the type of program or service and/or the type of interaction associated with the program or service may be received and processed at the terminal or receiver. For example, a receiver may receive an attribute indicating the type of program as a Basic TV program and may display the Basic TV program on a display. Also, the receiver may receive an attribute indicating that the type of interaction associated with the Basic TV program is an SMS messaging type of interaction. In this example, the receiver may the Basic TV program on the display and an indication (e.g., an icon, link, etc) on the display for the SMS messaging functionality. The displayed indication is separate from (i.e., not contained in) the program as received but is superimposed in the terminal. In one embodiment, the user can click or select the link and the interactive service will be activated.

Figure 9:
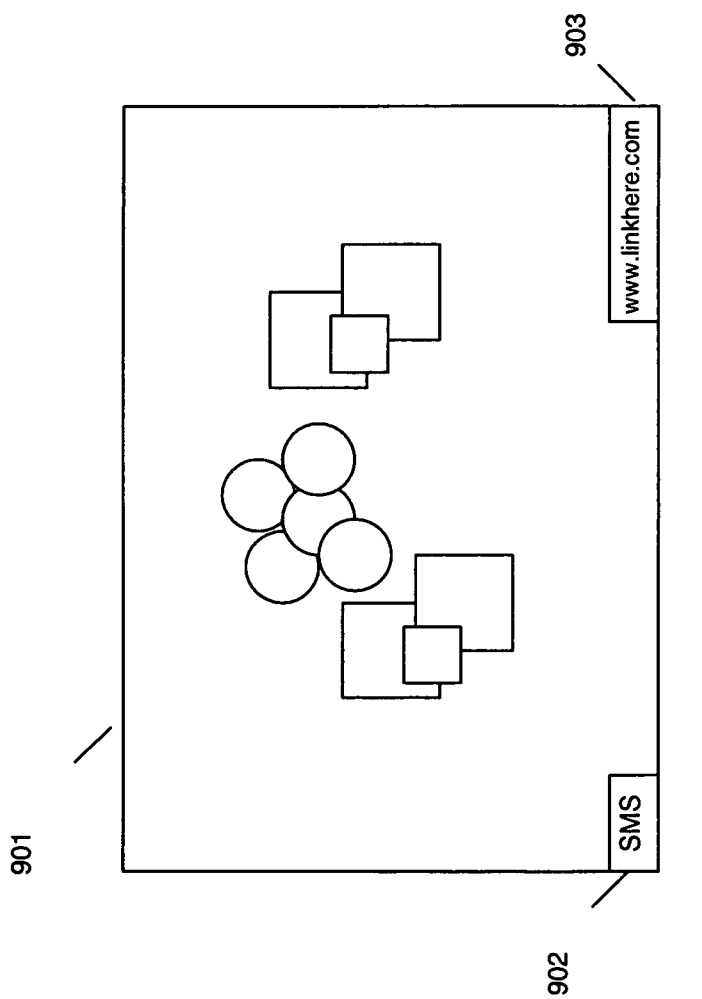
FIG. 9 illustrates an example of a user interface in which one or more illustrative embodiments of the invention may be implemented.

FIG. 9 illustrates an example of a user interface for providing information on a type of service or program or a type of interactivity associated with the program or service. In this example, a receiver may receive an ESG fragment containing a parameter, element or attribute for indicating a type of program or service and a type of interactivity associated with the program or service. The receiver parses the ESG fragment to identify the type of program—in this example, the type of program is Basic TV. The Basic TV program is displayed on a user interface 901 as illustrated in the example of FIG. 9. In addition, the ESG fragment in this example contains a parameter, element or attribute for indicating the type of interactivity associated with the program or service. For example, the type of interactivity associated with the Basic TV program of the example in FIG. 9 may be an SMS interactivity such that a subscriber may vote or provide other input corresponding to the Basic TV program. As FIG. 9 illustrates, an indication 902 may be provided for indicating that SMS messaging may be available for the associated Basic TV program.

Any type of interactivity may be associated with the program or service. As FIG. 9 illustrates, the program or service may be associated with www services. This may be indicated by a link 903 indicated on the user interface or display.

The present invention includes any novel feature or combination of features disclosed herein either explicitly or any generalization thereof. While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

What is claimed is:

1. A method comprising:
providing by a processor a first parameter within electronic service guide (ESG) data, wherein the ESG data corresponds to at least one subscribed program or service, wherein the first parameter indicates one of a plurality types of interactivity associated with the subscribed program or service, wherein the type of interactivity identifies one of a plurality types of interaction services of the subscribed program or service, wherein the interaction services include interaction with the subscribed program or service by one or more subscribers of the subscribed program or service during or after consumption of the subscribed program or service by the subscribers, and wherein the first parameter is provided in metadata of the ESG data.

2. The method of claim 1 wherein the first parameter further indicates a type of subscribed program or service selected from the group consisting of Basic TV, Basic Radio, Clipcast, File Download Services, Software management services, and notification services.

3. The method of claim 1, wherein the type of interactivity further corresponds to one interactivity that occurs during or after the consumption and that is selected from the group consisting of Short Message Service (SMS) messaging interactivity, Multimedia Messaging Service (MMS) messaging interactivity, E-mail messaging interactivity, service guide update interactivity, and www services interactivity, and wherein the first parameter is provided in metadata of the ESG data.

4. The method of claim 1 further comprising providing a second parameter in the ESG data for indicating a type of the subscribed program or service.

5. The method of claim 1 wherein the first parameter further indicates a type of the subscribed program or service and has a first value selected from a first plurality of values for indicating the type of subscribed program or service and a second value selected from a second plurality of values for indicating the type of interactivity associated with the subscribed program or service.

6. The method of claim 1 wherein the first parameter further indicates a type of the subscribed program or service and has a value corresponding to the type of the subscribed program or service and the type of interactivity associated with the subscribed program or service.

7. The method of claim 1 wherein the first parameter has a value selected from one of a first plurality of values and a second plurality of values, the first plurality of values corresponding to an indication of both a type of the subscribed program or service and the type of interactivity associated with the subscribed program or service and the second plurality of values corresponding to an indication of the type of interactivity associated with the subscribed program or service without an indication of the type of the subscribed program or service.

8. A method comprising:
receiving by a processor electronic service guide (ESG) data, the ESG data comprising a first parameter indicating one of a plurality types of interactivity associated with at least one subscribed program or service, wherein the type of interactivity identifies one of a plurality types of interaction services of the subscribed program or service, wherein the interaction services include interaction with the subscribed program or service by one or more subscribers of the subscribed program or service during or after consumption of the subscribed program or service by the subscribers, and wherein the first parameter is provided in metadata of the ESG data;
parsing by the processor the ESG data;
identifying by the processor the first parameter based on the parsing; and
determining by the processor the type of interactivity associated with the subscribed program or service based on the identified first parameter, wherein the type of interactivity identifies a communication protocol for communicating with an interaction service of the subscribed program or service, and wherein the first parameter is an integer that identifies the communication protocol for communicating with the interaction service.

9. The method of claim 8 wherein the first parameter further indicates a type of the subscribed program or service selected from the group consisting of Basic TV, Basic Radio, Clipcast, File Download Services, Software management services, and notification services and wherein the determining further comprises determining the type of the subscribed program or service based on the first parameter.

10. The method of claim 8, wherein the type of interactivity further corresponds to one interactivity that occurs during or after the consumption and that is selected from the group consisting of Short Message Service (SMS) messaging interactivity, Multimedia Messaging Service (MMS) messaging interactivity, E-mail messaging interactivity, service guide update interactivity, and www services interactivity, and wherein the first parameter is provided in metadata of the ESG data.

11. The method of claim 8 further comprising identifying a second parameter in the ESG data for indicating a type of the subscribed program or service.

12. The method of claim 11 wherein the determining further comprises determining the type of the subscribed program or service based on the identified second parameter.

13. The method of claim 8 wherein the first parameter further indicates a type of the subscribed program or service and has a first value selected from a first plurality of values for indicating the type of subscribed program or service and a second value selected from a second plurality of values for indicating the type of interactivity associated with the subscribed program or service.

14. The method of claim 13 wherein the determining comprises determining the type of subscribed program or service based on the first value of the identified first parameter and determining the type of interactivity associated with the subscribed program or service based on the second value of the identified first parameter.

15. The method of claim 8 wherein the first parameter further indicates a type of the subscribed program or service and has a value corresponding to both the type of subscribed program or service and the type of interactivity associated with the subscribed program or service.

16. The method of claim 8 wherein the first parameter indicates the type of interactivity associated with the subscribed program or service and does not indicate a type of the subscribed program or service.

17. The method of claim 8 wherein the first parameter has a value selected from one of a first plurality of values and a second plurality of values, the first plurality of values corresponding to an indication of both a type of the subscribed program or service and the type of interactivity associated with the subscribed program or service and the second plurality of values corresponding to an indication of interactivity associated with the subscribed program or service without the type of the program or service.

18. An apparatus comprising:
at least one processor; and
at least one memory including computer program code for one or more programs, the at least one memory and the computer program code configured to, with the at least one processor, cause the apparatus to perform at least the following,
receive data to be included in an electronic service guide (ESG) fragment for transmission,
wherein the ESG fragment provides information on at least one subscribed program or service;
determine a first parameter associated with one of a plurality types of interactivity associated with the subscribed program or service; and
assemble the ESG fragment including the first parameter, wherein the type of interactivity identifies one of a plurality types of interaction services of the subscribed program or service, wherein the interaction services include interaction with the subscribed program or service by one or more subscribers of the subscribed program or service during or after consumption of the subscribed program or service by the subscribers, and wherein the first parameter is provided in metadata of the ESG fragment.

19. The apparatus of claim 18 wherein the first parameter further indicates a type of subscribed program or service selected from the group consisting of Basic TV, Basic Radio, Clipcast, File Download Services, Software management services, and notification services.

20. The apparatus of claim 18, wherein the type of interactivity further corresponds to one interactivity that occurs during or after the consumption and that is selected from the group consisting of SMS messaging interactivity, MMS messaging interactivity, E-mail messaging interactivity, service guide update interactivity, and www services interactivity, and wherein the first parameter is provided in metadata of the ESG fragment.

21. The apparatus of claim 18, wherein the apparatus is further caused to:
determine a second parameter and include the second parameter in the ESG fragment, the second parameter indicating a type of the subscribed program or service.

22. An apparatus comprising:
at least one processor; and
at least one memory including computer program code for one or more programs,
the at least one memory and the computer program code configured to, with the at least one processor, cause the apparatus to perform at least the following,
receive an electronic service guide (ESG) fragment, wherein the ESG fragment provides information on at least one subscribed program or service;
parse a first parameter in the ESG fragment, the first parameter corresponding to one of a plurality types of interactivity associated with the subscribed program or service, and wherein the first parameter is provided in metadata of the ESG fragment; and
identify the first parameter and determine the type of interactivity associated with the subscribed program or service based on the first parameter, wherein the type of interactivity identifies one of a plurality types of interaction services of the subscribed program or service, and wherein the interaction services include interaction with the subscribed program or service by one or more subscribers of the subscribed program or service during or after consumption of the subscribed program or service by the subscribers.

23. The apparatus of claim 22 wherein the first parameter further corresponds to a type of subscribed program or service selected from the group consisting of Basic TV, Basic Radio, Clipcast, File Download Services, Software management services, and notification services.

24. The apparatus of claim 22, wherein the type of interactivity further corresponds to one interactivity that occurs during or after the consumption and that is selected from the group consisting of SMS messaging interactivity, MMS messaging interactivity, E-mail messaging interactivity, service guide update interactivity, and www services interactivity.

25. The apparatus of claim 22, wherein the apparatus is further caused to:
    identify a second parameter in the ESG fragment for indicating a type of the subscribed program or service.

26. The apparatus of claim 25, wherein the apparatus is further caused to:
    identify the second parameter and determine the type of the subscribed program or service based on the identified second parameter.

27. The apparatus of claim 22 wherein the first parameter has a first value selected from a first plurality of values for indicating a type of subscribed program or service and a second value selected from a second plurality of values for indicating the type of interactivity associated with the subscribed program or service.

28. The apparatus of claim 27, wherein the apparatus is further caused to:
    determine the type of subscribed program or service based on the first value of the identified first parameter and determine the type of interactivity associated with the subscribed program or service based on the second value of the identified first parameter.

29. The apparatus of claim 22 wherein the first parameter has a value corresponding to both a type of subscribed program or service and the type of interactivity associated with the subscribed program or service.

30. The apparatus of claim 22 wherein the first parameter corresponds to the type of interactivity associated with the subscribed program or service and does not correspond to a type of the subscribed program or service.

31. The apparatus of claim 22 wherein the first parameter has a value selected from one of a first plurality of values and a second plurality of values, the first plurality of values corresponding to an indication of both a type of the subscribed program or service and the type of interactivity associated with the subscribed program or service and the second plurality of values corresponding to an indication of the interactivity associated with the subscribed program or service without an indication of the type of the subscribed program or service.

32. A non-transitory computer-readable storage medium carrying one or more sequences of one or more instructions which, when executed by one or more processors, cause an apparatus to at least perform the following steps:
    receiving an electronic service guide (ESG) fragment associated with at least one subscribed program or service, the ESG fragment having a parameter corresponding to one of a type of subscribed program or service and a type of interactivity associated with the subscribed program or service and one of a plurality types of interactivity associated with the subscribed program or service, and wherein the parameter is provided in metadata of the ESG fragment;
    determining the type of interactivity associated with the subscribed program or service based on the parameter, wherein the type of interactivity identifies one of a plurality types of interaction services of the subscribed program or service, and wherein the interaction services include interaction with the subscribed program or service by one or more subscribers of the subscribed program or service during or after consumption of the subscribed program or service by the subscribers.

33. An apparatus comprising:
    at least one processor; and
    at least one memory including computer program code for one or more programs,
    the at least one memory and the computer program code configured to, with the at least one processor, cause the apparatus to perform at least the following,
    display at least one subscribed program or service; and
    visually superimpose over the subscribed program or service an interactivity indicator associated with the subscribed program or service, wherein the interactivity indicator is determined on the basis of a received electronic service guide (ESG) fragment comprising a parameter indicating a type of interactivity associated with the subscribed program or service, wherein the type of interactivity identifies one of a plurality types of interaction services of the subscribed program or service, wherein the interaction services include interaction with the subscribed program or service by one or more subscribers of the subscribed program or service during or after consumption of the subscribed program or service by the subscribers, and wherein the parameter is provided in metadata of the ESG fragment.

34. A non-transitory computer-readable storage medium carrying one or more sequences of one or more instructions which, when executed by one or more processors, cause an apparatus to at least perform the following steps:
    providing a first parameter within electronic service guide (ESG) data, wherein the ESG data corresponds to at least one subscribed program or service, wherein the first parameter indicates one of a plurality types of interactivity associated with the subscribed program or service, wherein the type of interactivity identifies one of a plurality types of interaction services of the subscribed program or service, wherein the interaction services include interaction with the subscribed program or service by one or more subscribers of the subscribed program or service during or after consumption of the subscribed program or service by the subscribers, and wherein the first parameter is provided in metadata of the ESG data.

35. The method of claim 8, further comprising visually superimposing over the subscribed program or service an interactivity indicator associated with the subscribed program or service.

36. The apparatus of claim 22, wherein the apparatus is further caused to:
    visually superimpose over the subscribed program or service an interactivity indicator associated with the subscribed program or service.

37. The method of claim 1, wherein the first parameter corresponds to an integer which value identifies the type of interactivity.

38. The method of claim 1, wherein the interaction services include voting by the one or more subscribers during or after the consumption.

* * * * *